United States Patent [19]
Brooke et al.

[11] Patent Number: 5,740,023
[45] Date of Patent: Apr. 14, 1998

[54] CONTROL SYSTEM FOR A MODULAR POWER SUPPLY AND METHOD OF OPERATION THEREOF

[75] Inventors: John Christopher Brooke; Chris Allan Lanzone, both of Dallas; Vijayan Joseph Thottuvelil, Collin, all of Tex.

[73] Assignee: Lucent Technologies Inc., Murray Hill, N.J.

[21] Appl. No.: 655,334

[22] Filed: May 24, 1996

[51] Int. Cl.[6] .................................................. H02M 11/00
[52] U.S. Cl. .................................................. 363/65; 363/69
[58] Field of Search .................................. 363/65, 69, 70, 363/71, 72, 84, 85

[56] References Cited

U.S. PATENT DOCUMENTS

| | | | |
|---|---|---|---|
| 3,648,147 | 3/1972 | Leete | 321/2 |
| 3,775,664 | 11/1973 | Forstmeyer | 321/18 |
| 4,451,773 | 5/1984 | Papathomas et al. | 320/59 |
| 4,468,722 | 8/1984 | Kammiller | 363/71 |
| 4,635,178 | 1/1987 | Greenhalgh | 363/65 |
| 4,717,833 | 1/1988 | Small | 307/44 |
| 4,814,965 | 3/1989 | Petersen | 363/65 |
| 4,924,170 | 5/1990 | Henze | 363/71 |
| 5,157,269 | 10/1992 | Jordan et al. | 363/72 |
| 5,164,890 | 11/1992 | Nakagawa et al. | 363/65 |
| 5,299,286 | 3/1994 | Imondi et al. | 395/27 |
| 5,338,994 | 8/1994 | Lezan et al. | 363/70 |
| 5,357,417 | 10/1994 | Desvaux | 363/71 |
| 5,428,523 | 6/1995 | McDonnal | 363/71 |
| 5,481,432 | 1/1996 | Tsukada et al. | 361/686 |
| 5,638,264 | 6/1997 | Hayashi et al. | 363/65 |
| 5,672,958 | 9/1997 | Brown et al. | 363/69 |

OTHER PUBLICATIONS

Document entitled "UC3907 Load Share IC Simplifies Parallel Power Supply Design" by Mark Jordan; from Integrated Circuits, pp. 9-296-9-305.

Document entitled "The Central-Limit Control and Impact of Cable Resistance in Current Distribution for Parallel-Connected DC-DC Converters" by T.F. Wu, K. Siri and J. Banda; 1994 IEEE, pp. 694-702.

Document entitled "A Novel, Low-Cost Implementation of Democratic Load-Current Sharing of Paralleled Converter Modules" by Milan M. Jovanovic, David E. Crow and Lieu Fang-Yi; 1994 IEEE; pp. 420-427.

Document entitled "A Selective Supervision Device for Paralleling Operating AC/DC and DC/DC Converters" by M. Grossoni and G. Cimador; pp. 587-593.

Document entitled "Current Distribution for Parallel-Connected DC Power Sources Without Remote Sensing" by Kasemsan Siri and Joe Banda; 1994 IEEE; pp. 196-203.

Document entitled "Load-Current-Sharing Control for Parallel Operation of DC-to-DC Converters" by Rein-Hua Wu, Teruhiko Kohama, Yuichi Kodera; Tamatsu Ninomiya and Fumiaka Ihara; pp. 101-107.

*Primary Examiner*—Peter S. Wong
*Assistant Examiner*—Derek J. Jardieu

[57] ABSTRACT

In a modular power supply having a plurality of module slots capable of receiving power supply modules therein, a system and method for controlling the power supply modules to regulate an overall output characteristic of the modular power supply, including: (1) an overall control circuit for sensing an overall output characteristic of the modular power supply and developing therefrom an overall error signal representing a deviation of the overall output characteristic from a reference characteristic and (2) a separate module control circuit for each of the power supply modules, each separate module control circuit sensing an output characteristic of an associated power supply module and developing therefrom and from the overall error signal a regulating signal for the associated power supply module, the regulating signal controlling the output characteristic of the associated power supply module to control the overall output characteristic of the modular power supply.

29 Claims, 6 Drawing Sheets

CONTROL SYSTEM FOR A MODULAR POWER SUPPLY AND METHOD OF OPERATION THEREOF

TECHNICAL FIELD OF THE INVENTION

The present invention is directed, in general, to modular power supplies and, more specifically, to a control system that regulates an output and simultaneously sustains load sharing among power supply modules of the modular power supply.

BACKGROUND OF THE INVENTION

It is not uncommon to find a power supply having a plurality of slots for receiving individual power supply modules. The modular architecture provides several advantages, including, an increase in the level of power that may be delivered to a load and an increase in the overall reliability of the power supply by sharing the load requirements among a plurality of redundant power supply modules. Additionally, the modular architecture enhances the flexibility of the power supply by allowing individual modules to be replaced to accommodate changes in the power supply requirements. Finally, the modular architecture provides a robust system whereby failed modules can be rapidly replaced with replacement modules.

Conventionally, the power supply may employ multiple converters in separate modules that convert an AC or DC input voltage to a DC output voltage. Again, the power supply may employ multiple converters in separate modules to increase the overall capacity and reliability of the power supply. The converters, in such a system, share the load to, among other things, evenly distribute stresses among the separate modules, while providing a regulated output to the load. Also, when a failure occurs in a modular system, it is possible to identify and shut down the failed unit without affecting the other parallel connected units, thereby minimizing the overall effects on the output of the power supply. While uniform power distribution or load sharing may be a goal of parallel converters in the modular power supply, several factors contribute to non-uniform distribution. For instance, as component tolerances and the characteristics of the components change due to uneven aging and different physical conditions, the power distribution therefrom also changes. Therefore, efforts should be made to adequately control the modules to regulate the output of the power supply and compensate for individual variations in the power supply modules.

There are a number of alternatives well known in the prior art that attempt to achieve load sharing among parallel modules in a modular power supply. One of the simplest methods for load sharing is commonly referred to as the droop method. The droop method is an open-loop technique that programs the output impedance of the power supply modules to attain load sharing. A disadvantage of this type of technique is that there is poor regulation of the output voltage of the power supply. In addition, while this method obtains relatively acceptable load sharing at higher currents, at lower currents the droop method exhibits poor load sharing leading to large current imbalances between power supply modules.

A second alternative is to select a master module to perform voltage control at the output of the power supply and force the remaining modules (i.e., slaves) to act as current sources. Since an error voltage is proportional to the load current, this alternative generally employs current-mode control. If the modules are similar in design then a given error voltage at the output, or error amplitude, will compel the modules to source the same load current. A major deficiency with the master/slave option is that if the master fails, the entire system is disabled thereby defeating the redundancy of the modular power supply.

Another conventional method is a current sharing technique referred to as central limit control ("CLC"). The CLC design requires that the parallel modules regulate the voltage across the shared load and the voltage feedback loops of the modules sense the load voltage. As a result, the CLC provides voltage regulation at the output of the power supply and current sharing among the modules. There are several variations of this method including CLC with common voltage feedback and fixed reference voltage. Under this approach, the common output voltage across the shared load is regulated to a fixed reference through identical voltage error compensators. The operating control voltage that feeds the driver of each module is compensated by a corresponding error signal to produce current sharing among the power supply modules. While this alternative provides adequate load sharing for identical power supply modules, it cannot adequately compensate for variations in the individual power supply modules (e.g., variations in tolerances) due to the non-identical compensators employed therein.

Accordingly, what is needed in the art is a control system for a modular power supply that maintains a well regulated output and employs current sharing among the power supply modules, while compensating for variations in the performance and tolerances of the individual power supply modules.

SUMMARY OF THE INVENTION

To address the above-discussed deficiencies of the prior art, the present invention provides, in a modular power supply having a plurality of module slots capable of receiving power supply modules therein, a system and method for controlling the power supply modules to regulate an overall output characteristic of the modular power supply.

The system includes: (1) an overall control circuit for sensing the overall output characteristic of the modular power supply and developing therefrom an overall error signal representing a deviation of the overall output characteristic from a reference characteristic and (2) a separate module control circuit for each of the power supply modules, each separate module control circuit sensing an output characteristic of an associated power supply module and developing therefrom and from the overall error signal a regulating signal for the associated power supply module. The regulating signal controls the output characteristic of the associated power supply module to control the overall output characteristic of the modular power supply.

The system of the present invention provides precise regulation of the overall output characteristic of the modular power supply, while concurrently maintaining load sharing among the power supply modules of the power supply. The system attains this higher level of regulation by employing both system-wide and individual modular control. The overall control circuit develops the overall or common error signal that the module control circuits employ, in conjunction with an output characteristic of the individual module, to develop a regulating signal that controls the output of each power supply module. By selecting the gain of the compensation circuits to adequately amplify the common error signal, the output characteristic can be regulated to track the reference characteristic very closely. The system performance can be achieved despite changes in the load, errors in sensing the output characteristic of any particular power supply module, variations in the tolerances of the power supply components or variations in the gains of the compensation circuits employed in the power supply.

In an alternative embodiment of the present invention, the separate module control circuit senses an output current of the associated power supply module and develops therefrom a current error signal representing a deviation from an average of output currents of the power supply modules. The separate module control circuit combines the current error signal with the overall error signal to further develop the regulating signal. In a related, but alternative embodiment of the present invention, the separate module control circuit senses an actual output current of the associated power supply module and develops therefrom a current error signal representing a deviation of a ratio of the actual output current to a maximum output current of the associated power supply module from a ratio of an actual output current of the modular power supply to a maximum output current of the modular power supply. Again, the separate module control circuit combines the current error signal with the overall error signal to further develop said regulating signal. The system of the present invention is compatible with a modular power supply employing non-identical power supply modules (e.g., the power supply modules have varying maximum current carrying capability). In either embodiment, the separate module control circuit derives the regulating signal from the output characteristic of the associated power supply module, the overall error signal and the current error signal.

In an alternative embodiment of the present invention, the separate module control circuit develops the regulating signal from a second reference characteristic signal of the associated power supply module. The regulating signal is derived with the addition of the second reference characteristic thereby increasing the reliability of the overall system. For instance, if the common error signal is interrupted, the power supply modules may still develop the regulating signal to control an output therefrom and the overall output characteristic of the power supply.

In an alternative embodiment of the present invention, the separate module control circuit develops the regulating signal directly from the overall output characteristic. By developing the regulating signal from the overall output characteristic, the reliability of the system is enhanced to accommodate unforeseen conditions such as when the common error signal is interrupted.

In an alternative embodiment of the present invention, the system includes: (1) a first sample and hold circuit for receiving and temporarily storing the overall output characteristic, the overall control circuit developing therefrom a sampled overall error signal, (2) a second sample and hold circuit for receiving and temporarily storing an output current of the associated power supply module, the separate module control circuit developing therefrom a sampled current error signal representing a deviation from an average of output currents of the power supply modules and (3) an accumulator, associated with the separate module control circuit, for generating an intermediate regulating signal from the sampled overall error signal and said sampled current error signal. In a related, but alternative embodiment of the present invention, the sampled current error signal represents a deviation of a ratio of an actual output current to a maximum output current of the associated power supply module from a ratio of an actual output current of the modular power supply to a maximum output current of the modular power supply. In either case, the intermediate regulating signal is derived from an accumulated and sampled overall error signal and current error signal. The present embodiments provide several advantages, namely, the capability to more precisely regulate the overall output characteristic of the modular power supply and the ability to maintain the regulating signal at the last known value in the event of a failure of the overall control circuit.

In an alternative embodiment of the present invention, the overall output characteristic is a function of an output voltage of the modular power supply. One of ordinary skill in the pertinent art should understand that other electrical characteristics, such as, without limitation, an output current, may also serve as the overall output characteristic of the modular power supply.

Another aspect of the present invention is, for use in a modular power supply having a plurality of module slots capable of receiving power supply modules therein and an overall control circuit for sensing an overall output characteristic of the modular power supply and developing therefrom an overall error signal representing a deviation of the overall output characteristic from a reference characteristic, a power supply module, including: (1) power conversion circuitry and (2) a module control circuit constructed according to the principles of the present invention. One of ordinary skill in the pertinent art should understand that the power conversion circuitry includes any circuitry, such as, without limitation, a DC/DC power converter, that transforms one form of electrical power to another.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
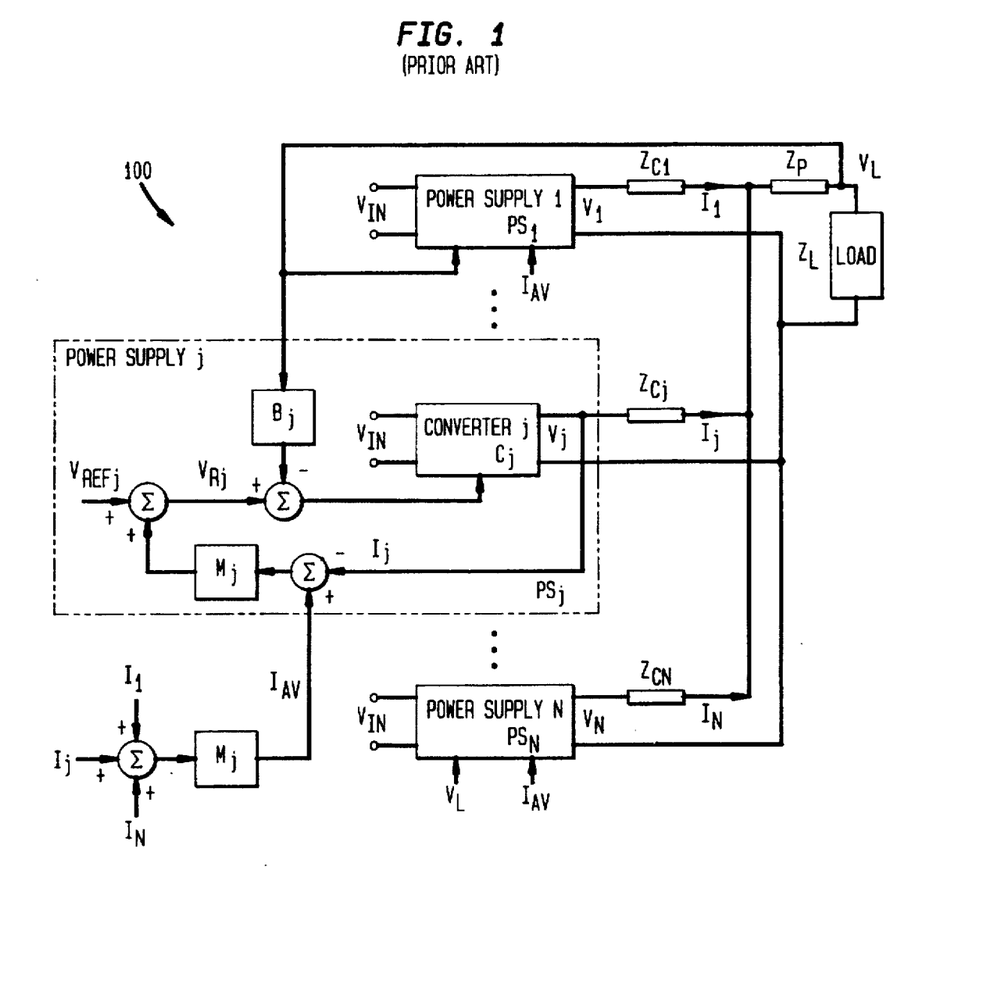
FIG. 1 illustrates a prior art control system for a modular power supply.

Referring initially to FIG. 1, illustrated is a prior art control system for a modular power supply 100. The power supply 100 includes <N> power supply modules $PS_1$ to $PS_N$ in parallel that deliver power to a common load LOAD. While the individual components of the power supply module $PS_j$ are illustrated and the operation thereof will hereinafter be described, the principles are equally applicable to the other power supply modules $PS_1$ to $PS_N$ employed by the modular power supply 100.

The power supply module $PS_j$ is connected in series with a interconnection impedance $Z_{cj}$ and a common interconnection impedance $Z_p$ to the load LOAD. The load voltage $V_L$ is sensed and sent to the power supply module $PS_j$. The output current $I_j$ of the power supply module $PS_j$ is compared with a signal equal to the average output current $I_{AV}$ of all the power supplies $PS_1$ to $PS_N$; a resulting error signal is processed by a compensation circuit represented by a control block $M_j$ to yield a current error signal for the power supply module $PS_j$. The current error signal is added to the reference voltage $V_{REFj}$ to create a voltage $V_{Rj}$. The voltage $V_{RJ}$ is compared to the common fed back load voltage $V_L$, processed by a compensation circuit represented by a control block $B_j$, and the resulting voltage is used to control an output voltage $V_j$ of the power supply module $PS_j$.

In this prior art control system, the power supply modules $PS_1$ to $PS_N$ share the load current and the load voltage $V_L$ is regulated at a level that is an average of the individual power supply module reference voltages. The dependence of the load voltage $V_L$ on the average value of the individual power supply modules reference voltages makes precise regulation of the load voltage $V_L$ very difficult. If the load voltage $V_L$ needs to be adjusted, then the reference voltage of each power supply module $PS_1$ to $PS_N$ must be adjusted via a manual iterative process until the desired level of the load voltage $V_L$ is obtained and all of the power supply modules $PS_1$ to $PS_N$ are delivering the same current. When the power supply modules $PS_1$ to $PS_N$ are added or removed from the modular power supply 100, this manual iterative process must be repeated.

Figure 2:
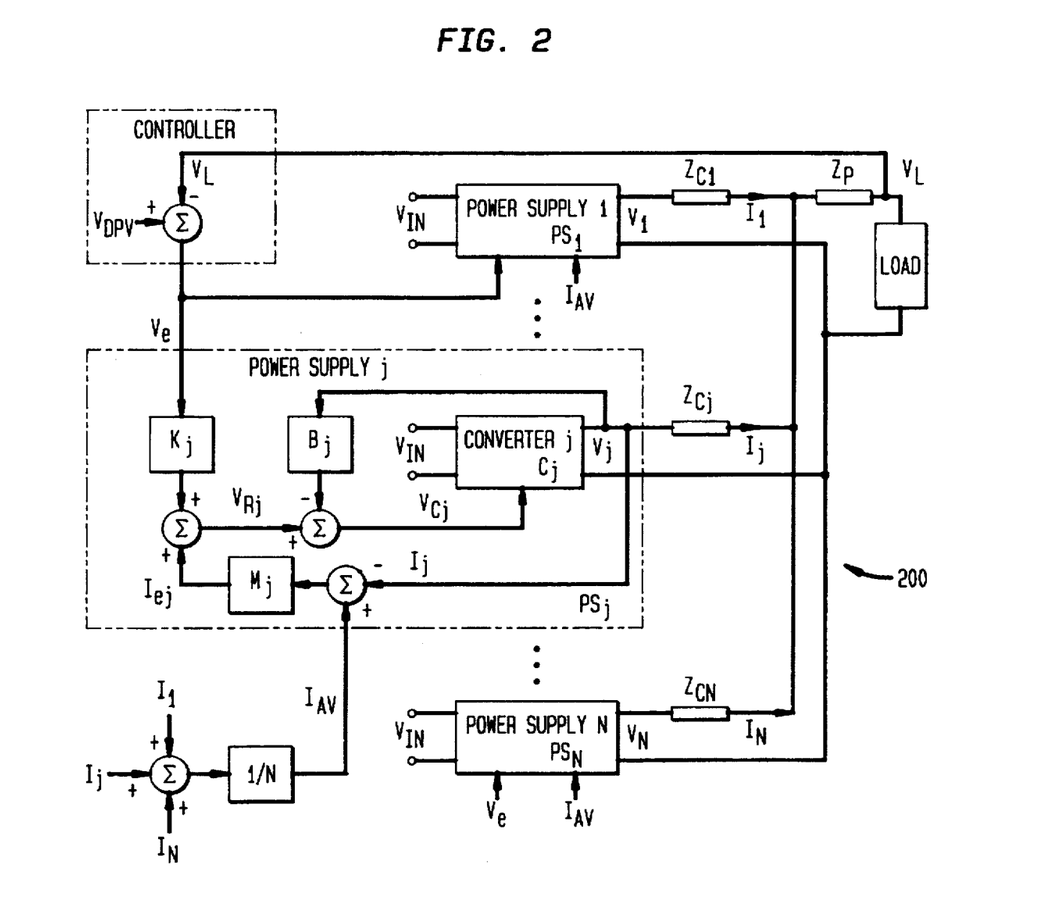
FIG. 2 illustrates a modular power supply employing one embodiment of a control system constructed according to the principles of the present invention.

Turning now to FIG. 2, illustrated is a modular power supply 200 employing one embodiment of a control system constructed according to the principles of the present invention. Analogous to the modular power supply 100 of FIG. 1, the modular power supply 200 includes <N> power supply modules $PS_1$ to $PS_N$ in parallel that deliver power to a common load LOAD. While the individual components of the power supply module $PS_j$ are illustrated and the operation thereof will hereinafter be described, the principles are equally applicable to the other power supply modules $PS_1$ to $PS_N$ employed by the modular power supply 200. The control system of the present invention includes an overall control circuit illustrated as the circuitry from the load LOAD through a controller CONTROLLER to a compensation circuit represented by a control box $K_j$. The control system of the present invention also includes a separate module control circuit (associated with each power supply module $PS_1$ to $PS_N$) illustrated as compensation circuits represented by control blocks $K_j$, $B_j$, $M_j$ in the power supply module $PS_j$.

An overall output characteristic or load voltage $V_L$ is sensed and compared to a reference characteristic or reference voltage $V_{DPV}$ for the modular power supply 200 to generate an overall (or common) error signal or common error voltage $V_e$ that is sent to the power supply modules $PS_1$ to $PS_N$. The output current $I_j$ of the power supply module $PS_j$ is sensed and compared to an average output current $I_{AV}$ of the power supply modules $PS_1$ to $PS_N$ and the resulting error signal is processed by the compensation circuit $M_j$ to yield a current error signal $I_{ej}$. If the power supply modules $PS_1$ to $PS_N$ have varying maximum current capabilities, the current error signal $I_{ej}$ is derived representing a deviation of a ratio of the output current $I_j$ to a maximum output current capability $I_{j(max)}$ of the power supply module $PS_j$ from a ratio of an actual output current of the modular power supply 200 to a maximum output current of the modular power supply 200. In either case, the common error voltage $V_e$ (where $V_e = V_L - V_{DPV}$) is processed by the compensation circuit $K_j$ and the resulting signal is added to the current error signal $I_{ej}$ to obtain the reference voltage $V_{Rj}$ for a converter $C_j$ (i.e., the power conversion circuitry). The converter $C_j$ regulates an output characteristic or output voltage $V_j$ such that the difference $V_{Rj} - B_j V_j$ is approximately zero. The output voltage $V_j$ (processed by the compensation circuit $B_j$) combined with the reference voltage $V_{Rj}$ provides a regulating signal $V_{Cj}$ to control the converter $C_j$ to ultimately more precisely regulate the load voltage $V_L$. By adjusting the gains of the compensation circuit $K_j$ to be relatively large, the load voltage $V_L$ is approximately equal to the common reference voltage $V_{DPV}$. Therefore, only the reference voltage $V_{DPV}$ need be adjusted to regulate the load voltage $V_L$ thereby avoiding the manual iterative process of the prior art.

Figure 3:
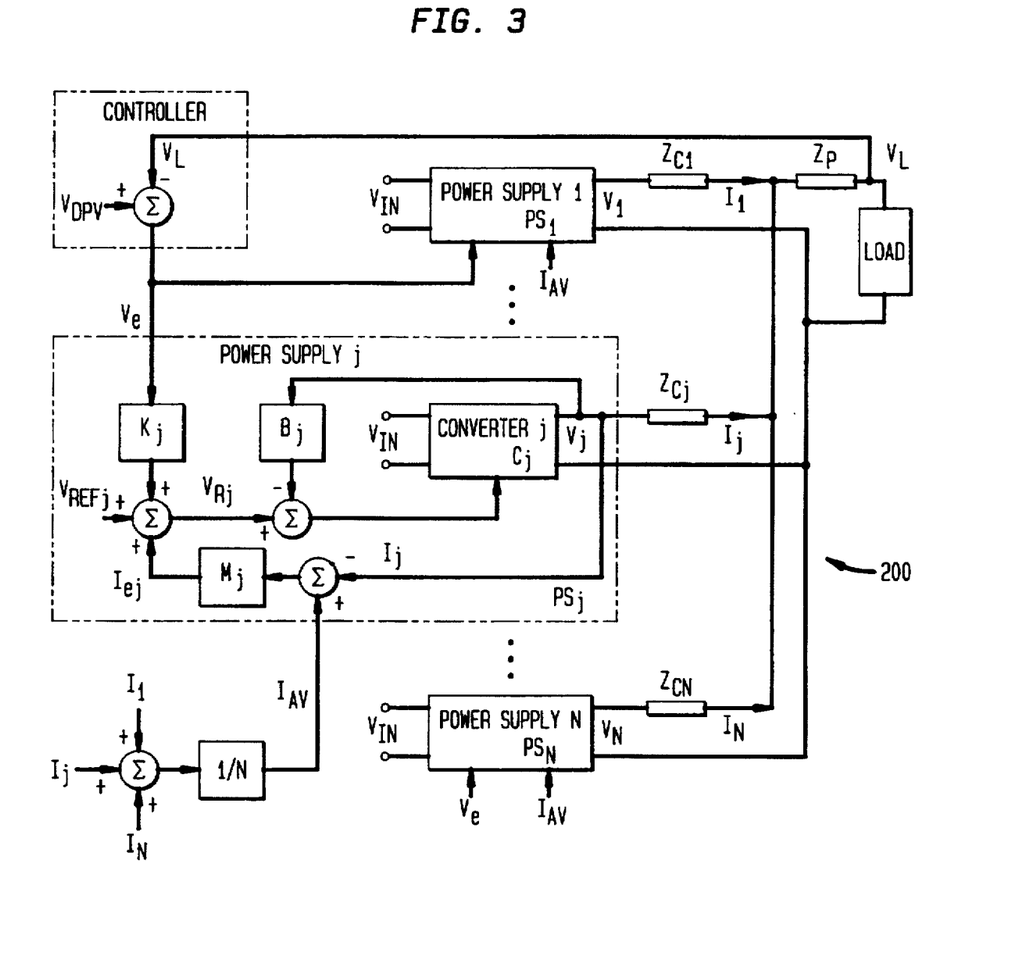
FIG. 3 illustrates the modular power supply of FIG. 2 employing another embodiment of a control system constructed according to the principles of the present invention.

Turning now to FIG. 3, illustrated is the modular power supply 200 of FIG. 2 employing another embodiment of a control system constructed according to the principles of the present invention. Again, the power supply 200 includes <N> power supply modules $PS_1$ to $PS_N$ in parallel that deliver power to a common load LOAD. While the individual components of the power supply module $PS_j$ are illustrated and the operation thereof will hereinafter be described, the principles are equally applicable to the other power supply modules $PS_1$ to $PS_N$ employed by the modular power supply 200. The control system of the present invention includes the overall control circuit and separate module control circuit (associated with each power supply module $PS_1$ to $PS_N$) as described with respect to FIG. 2.

The control system further includes a second reference characteristic or an additional reference voltage $V_{REFj}$ for the power supply modules $PS_1$ to $PS_N$. The reference voltage $V_{REFj}$ is added to the common error voltage $V_e$ and the current error signal $I_{ej}$ to obtain the reference voltage $V_{Rj}$ for the converter $C_j$. Again, the converter $C_j$ regulates its output voltage $V_j$ so that the difference $V_{Rj} - B_j V_j$ is approximately zero. The output voltage $V_j$ (processed by the compensation circuit $B_j$) is also combined with the reference voltage $V_{Rj}$ to provide a regulating signal $V_{cj}$ to control the converter $C_j$ to ultimately more precisely regulate the load voltage $V_L$. Analogous to the control system of FIG. 2, by adjusting the gain of the compensation circuit $K_j$ to be relatively large, the load voltage $V_L$ is approximately equal to the common reference voltage $V_{DPV}$ thereby providing the advantages as described with respect to FIG. 2. An additional advantage of the present embodiment is the added reliability provided with the second reference characteristic $V_{REFj}$. Simply stated, if the common error voltage $V_e$ signal is interrupted, the load voltage $V_L$ will still be sufficiently regulated to an average output voltage of the power supply modules $PS_1$ to $PS_N$ less the voltage drops in the impedances $Z_{cj}$ and $Z_j$. This feature provides additional reliability for the power supply 200 while maintaining current sharing between the power supply modules $PS_1$ to $PS_N$.

Figure 4:
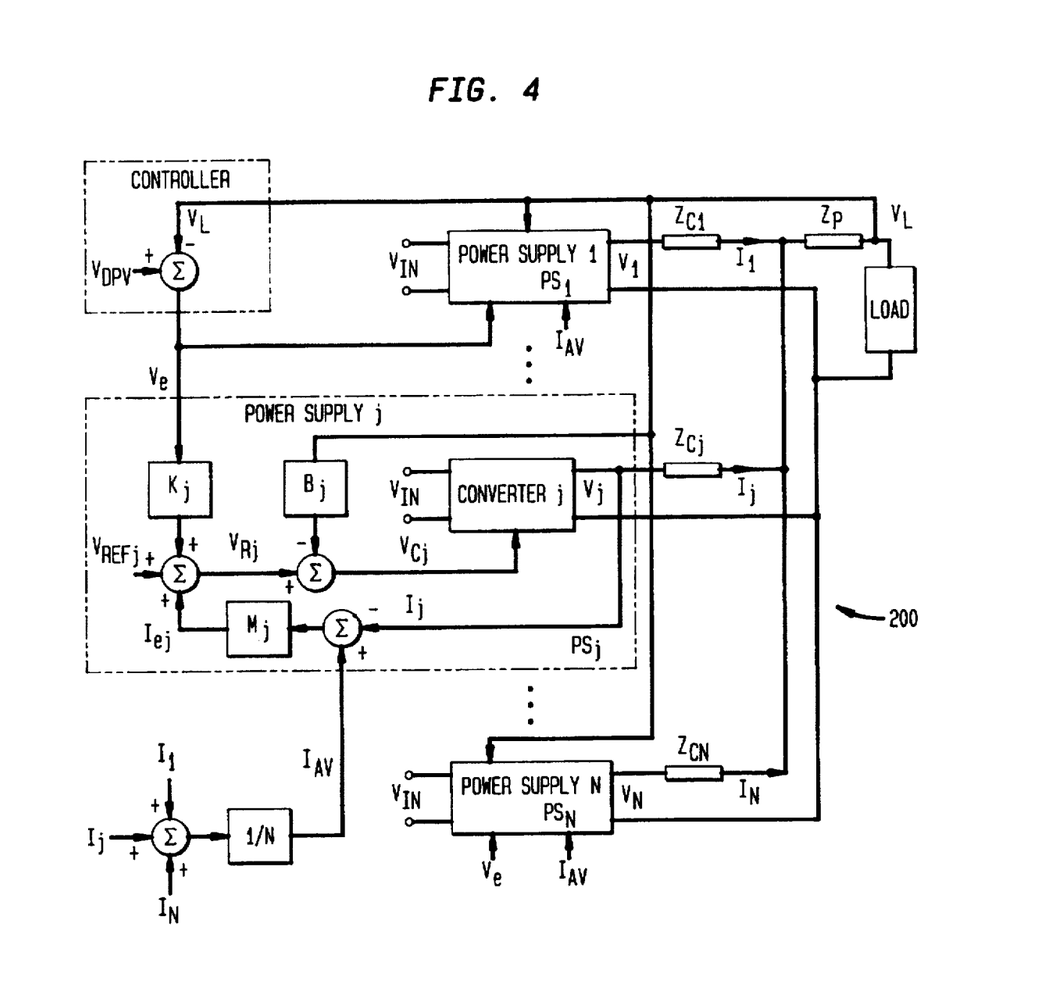
FIG. 4 illustrates the modular power supply of FIG. 2 employing yet another embodiment of a control system constructed according to the principles of the present invention.

Turning now to FIG. 4, illustrated is the modular power supply 200 of FIG. 2 employing yet another embodiment of a control system constructed according to the principles of the present invention. Again, the power supply 200 includes <N> power supply modules $PS_1$ to $PS_N$ in parallel that deliver power to a common load LOAD. While the individual components of the power supply module $PS_j$ are illustrated and the operation thereof will hereinafter be described, the principles are equally applicable to the other power supply modules $PS_1$ to $PS_N$ employed by the modular power supply 200. The control system of the present invention includes the overall control circuit and separate module control circuit (associated with each power supply module $PS_1$ to $PS_N$) as described with respect to FIG. 2.

For purposes of the present embodiment, the load voltage $V_L$ is fed back to the compensation circuit $B_j$ of the power supply module $PS_j$ instead of the output voltage $V_j$ as illustrated with respect to FIGS. 2 and 3. The control system, therefore, improves regulation of the load voltage $V_L$ at the load LOAD when the common error voltage $V_e$ signal is interrupted. Under such circumstances, the load voltage $V_L$ is regulated at a level corresponding to an average of the power supply module $PS_1$ to $PS_N$; also, the voltage drops in the impedances $Z_{cj}$ and $Z_p$ are effectively removed from the loop thereby further improving the regulation of the load voltage $V_L$.

Figure 5:
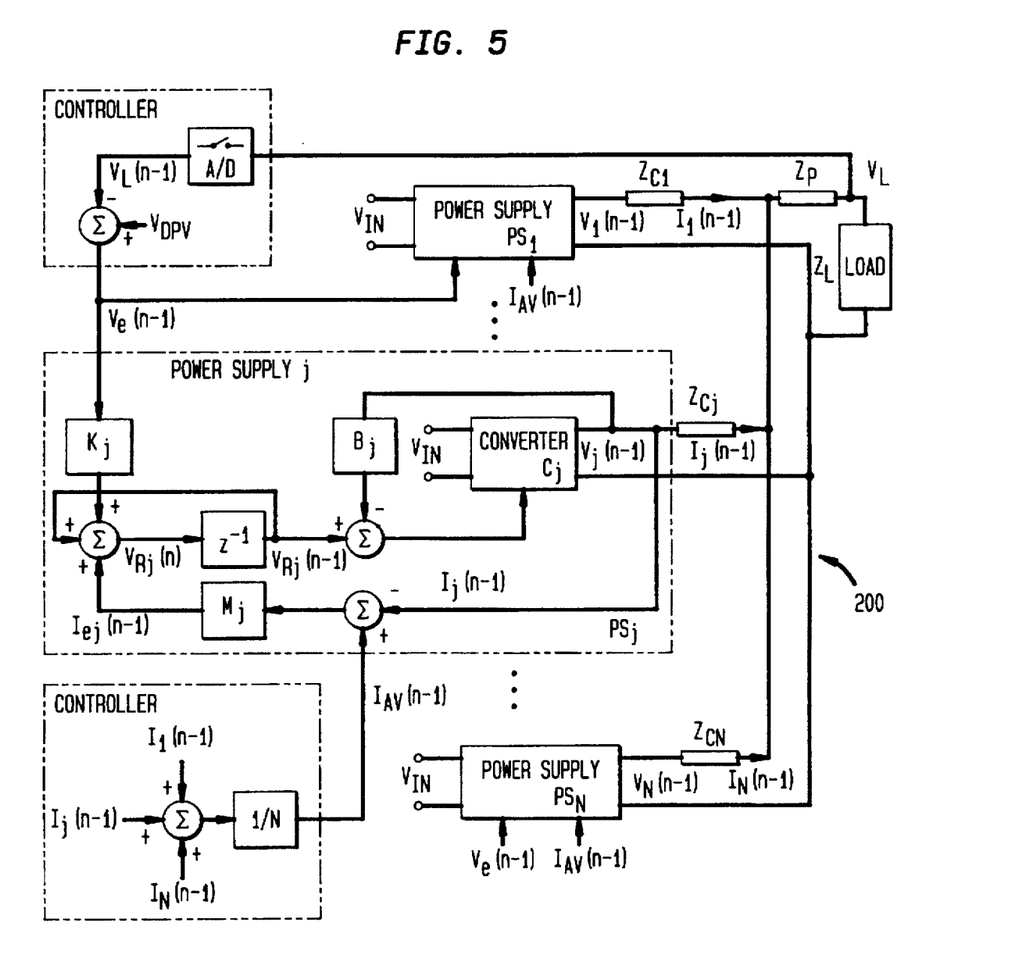
FIG. 5 illustrates the modular power supply of FIG. 2 employing yet another embodiment of a control system constructed according to the principles of the present invention.

Turning now to FIG. 5, illustrated is the modular power supply 200 of FIG. 2 employing yet another embodiment of a control system constructed according to the principles of the present invention. Again, the power supply 200 includes <N> power supply modules $PS_1$ to $PS_N$ in parallel that deliver power to a common load LOAD. While the individual components of the power supply module $PS_j$ are illustrated and the operation thereof will hereinafter be described, the principles are equally applicable to the other power supply modules $PS_1$ to $PS_N$ employed by the modular power supply 200. The control system of the present invention includes the overall control circuit and separate module control circuit (associated with each power supply module $PS_1$ to $PS_N$) as described with respect to FIG. 2. The control system, as illustrated in the present embodiment, also includes (1) a first sample and hold circuit contained in an Analog-to-Digital ("A/D") converter, (2) an accumulator illustrated as a compensation circuit represented by a control box $z^{-1}$ and (3) a second sample and hold circuit contained in the controller CONTROLLER.

The load voltage $V_L$ is sampled and converted to a digital signal through an Analog-to-Digital ("A/D") converter. The digitized load voltage $V_L$ (n−1) is subtracted from the common reference value $V_{DPV}$ and the resulting common error voltage $V_e$(n−1) is sent to the power supply modules $PS_1$ to $PS_N$ periodically. In addition, the output currents $I_1$(n−1) to $I_N$(n−1) from the power supply modules $PS_1$ to $PS_N$, respectively, are periodically digitized and an average value $I_{AV}$(n−1) is computed and sent to the power supply modules $PS_1$ to $PS_N$ periodically. The power supply module $PS_j$, for instance, then derives a current error signal $I_{AV}$(n−1) by processing the difference between the average current $I_{AV}$(n−1) and the output current $I_j$(n−1) of the power supply module $PS_j$ via the compensation circuit $M_j$. The (n−1) sample of the power supply module's reference voltage or intermediate regulating signal $V_{Rj}$(n−1) is obtained through the following equation:

$$V_{Rj}(n) = V_{Rj}(n-1) + K_j[V_{DPV} - V_L(n-1)] + M_j[I_{AV}(n-1) - I_j(n-1)]$$

The voltage $V_{Rj}$(n−1) serves as a reference that the voltage $V_j$(n−1) is regulated to through the power supply module $PS_j$. Again, the load voltage $V_L$ is precisely regulated to the desired level $V_{DPV}$ and the power supply modules $PS_1$ to $PS_N$ share the load LOAD. The control system of the present embodiment demonstrates improved noise immunity in the transmission of the common error voltage $V_e$ and the average current $I_{AV}$ because of the digital transmission of the signals in the power supply 200. Additionally, the reference voltage $V_{Rj}$(n) of the power supply module $PS_j$ is stored in digital memory thereby increasing the reliability of the power supply 200 in the event that the common error voltage $V_e$ or the average current $I_{AV}$ is interrupted. Under these circumstances, the power supply module $PS_j$ may employ the last stored value of the reference voltage $V_{Rj}$(n−1) to regulate the output voltage $V_j$(n−1) of the converter $C_j$ and to maintain the load voltage $V_L$ at the desired level. Also, the power supply modules $PS_1$ to $PS_N$ maintain current sharing provided that the load current remains relatively constant and the control parameters of the power supply modules $PS_1$ to $PS_N$ do not drift appreciably.

Figure 6:
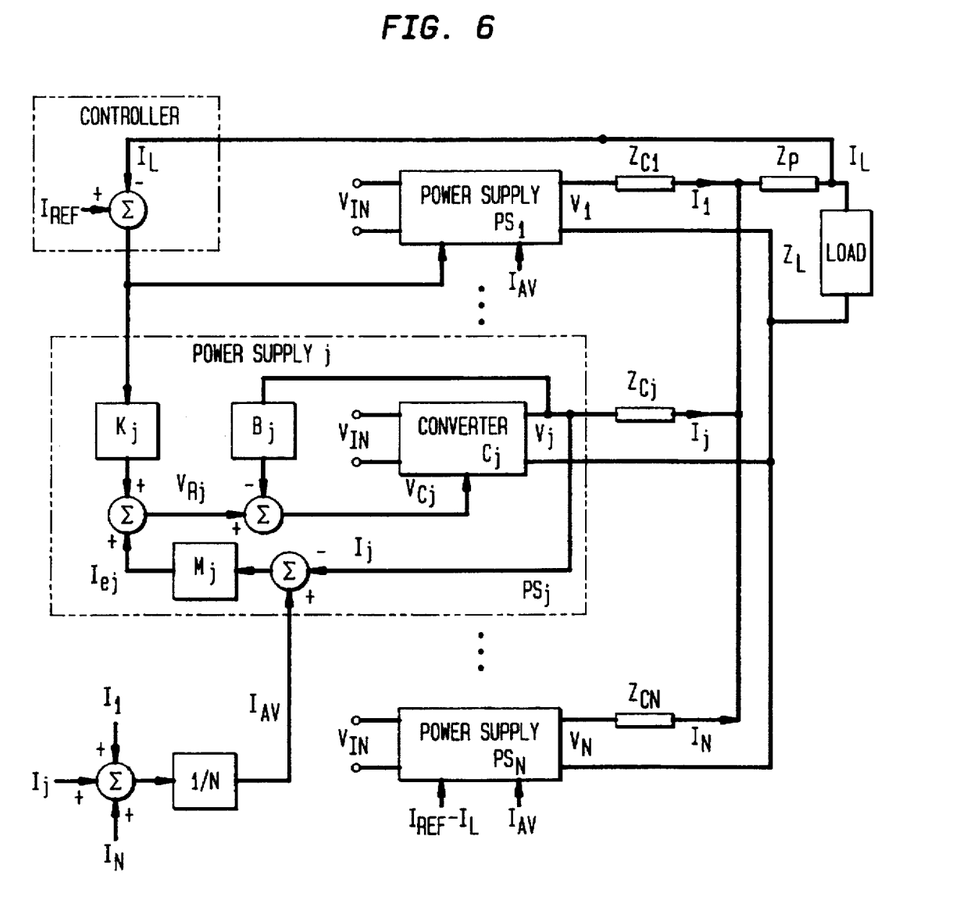
FIG. 6 illustrates the modular power supply of FIG. 2 employing yet another embodiment of a control system constructed according to the principles of the present invention.

Turning now to FIG. 6, illustrated is the modular power supply 200 of FIG. 2 employing yet another embodiment of a control system constructed according to the principles of the present invention. Again, the power supply 200 includes <N> power supply modules $PS_1$ to $PS_N$ in parallel that deliver power to a common load LOAD. While the individual components of the power supply module $PS_j$ are illustrated and the operation thereof will hereinafter be described, the principles are equally applicable to the other power supply modules $PS_1$ to $PS_N$ employed by the modular power supply 200. The control system of the present invention includes the overall control circuit and separate module control circuit (associated with each power supply module $PS_1$ to $PS_N$) as described with respect to FIG. 2.

In the illustrated embodiment, the load current $I_L$ is sensed and compared with a reference signal $I_{REF}$, representing a desired load current level, to generate a common load current error $I_{REF} - I_L$. The common load current error $I_{REF} - I_L$ is sent to power supply modules $PS_i$ to $PS_N$. The output current $I_j$ of the power supply module $PS_j$ is sensed and compared to an average output current $I_{AV}$ and the resulting signal is processed by the compensation circuit $M_j$ to yield the current error signal $I_{ej}$. The common load current error signal $I_{REF} - I_L$ is processed by the compensation circuit $K_j$ and the resulting signal is added to the current error signal $I_{ej}$ to obtain the reference voltage $V_{Rj}$ for the converter $C_j$. Again, the converter $C_j$ regulates its output voltage $V_j$ so that the difference $V_{Rj} - B_j V_j$ is approximately zero. The output voltage $V_j$ (processed by the compensation circuit $B_j$) is also combined with the reference voltage $V_{Rj}$ to provide a regulating signal $V_{cj}$ to control the converter $C_j$. By adjusting the gains of the compensation circuit $K_j$ to be relatively large, the load current $I_L$ is approximately equal to the reference current $I_{REF}$. Therefore, only the reference current $I_{REF}$ need be adjusted to regulate the load current $I_L$ thereby avoiding the manual iterative process of the prior art.

Although the present invention has been described in detail, those skilled in the art should understand that they can make various changes, substitutions and alterations herein without departing from the spirit and scope of the invention in its broadest form.

What is claimed is:

1. In a modular power supply having a plurality of module slots capable of receiving power supply modules therein, a system for controlling said power supply modules to regulate an overall output characteristic of said modular power supply, comprising:

an overall control circuit for sensing said overall output characteristic of said modular power supply and developing therefrom an overall error signal representing a deviation of said overall output characteristic from a reference characteristic; and a separate module control circuit for each of said power supply modules, said separate module control circuit sensing an output characteristic of an associated power supply module and developing therefrom and from said overall error signal a regulating signal for said associated power supply module, said regulating signal controlling said output characteristic of said associated power supply module to control said overall output characteristic of said modular power supply.

2. The system as recited in claim 1 wherein said separate module control circuit senses an output current of said associated power supply module and develops therefrom a current error signal representing a deviation from an average of output currents of said power supply modules, said separate module control circuit combining said current error signal with said overall error signal to further develop said regulating signal.

3. The system as recited in claim 1 wherein said separate module control circuit senses an actual output current of said associated power supply module and develops therefrom a current error signal representing a deviation of:

a ratio of said actual output current to a maximum output current of said associated power supply module from a ratio of an actual output current of said modular power supply to a maximum output current of said modular power supply, said separate module control circuit combining said current error signal with said overall error signal to further develop said regulating signal.

4. The system as recited in claim 1 wherein said separate module control circuit develops said regulating signal from a second reference characteristic of said associated power supply module.

5. The system as recited in claim 1 wherein said separate module control circuit develops said regulating signal directly from said overall output characteristic.

6. The system as recited in claim 1, further comprising:

a first sample and hold circuit for receiving and temporarily storing said overall output characteristic, said overall control circuit developing therefrom a sampled overall error signal;

a second sample and hold circuit for receiving and temporarily storing an output current of said associated power supply module, said separate module control circuit developing therefrom a sampled current error signal representing a deviation from an average of output currents of said power supply modules; and an accumulator, associated with said separate module control circuit, for generating an intermediate regulating signal from said sampled overall error signal and said sampled current error signal.

7. The system as recited in claim 1, further comprising:

a first sample and hold circuit for receiving and temporarily storing said overall output characteristic, said overall control circuit developing therefrom a sampled overall error signal;

a second sample and hold circuit for receiving and temporarily storing an actual output current of said associated power supply module, said separate module control circuit developing therefrom a sampled current error signal representing a deviation of:

a ratio of said actual output current to a maximum output current of said associated power supply module from a ratio of an actual output current of said modular power supply to a maximum output current of said modular power supply; and an accumulator, associated with said separate module control circuit, for generating of an intermediate regulating signal from said sampled overall error signal and said sampled current error signal.

8. The system as recited in claim 1 wherein said overall output characteristic is a function of an output voltage of said modular power supply.

9. The system as recited in claim 1 wherein said overall output characteristic is a function of an output current of said modular power supply.

10. The system as recited in claim 1 wherein said each of said power supply modules comprises power conversion circuitry coupled to an output of said modular power supply via an impedance network.

11. In a modular power supply having a plurality of module slots capable of receiving power supply modules therein, a method of controlling said power supply modules to regulate an overall output characteristic of said modular power supply, comprising the steps of:

sensing an overall output characteristic of said modular power supply with an overall control circuit, said overall control circuit developing therefrom an overall error signal representing a deviation of said overall output characteristic from a reference characteristic; and sensing an output characteristic of an associated power supply module with a separate module control circuit associated with each of said power supply modules, said separate module control circuit developing therefrom and from said overall error signal a regulating signal for said associated power supply module, said regulating signal controlling said output characteristic of said associated power supply module to control said overall output characteristic of said modular power supply.

12. The method as recited in claim 11 wherein said step of sensing an output characteristic comprises the step of sensing an output current of said associated power supply module and developing therefrom a current error signal representing a deviation from an average of output currents of said power supply modules, said step of sensing an output current further comprises the step of combining said current error signal with said overall error signal to further develop said regulating signal.

13. The method as recited in claim 11 wherein said step of sensing an output characteristic comprises the step of sensing an actual output current of said associated power supply module and developing therefrom a current error signal representing a deviation of:

a ratio of said actual output current to a maximum output current of said associated power supply module from a ratio of an actual output current of said modular power supply to a maximum output current of said modular power supply, said step of sensing an actual output current further comprises the step of combining said current error signal with said overall error signal to further develop said regulating signal.

14. The method as recited in claim 11 wherein said step of sensing an output characteristic comprises the step of developing said regulating signal from a second reference characteristic of said associated power supply module.

15. The method as recited in claim 11 wherein said step of sensing an output characteristic comprises the step of developing said regulating signal directly from said overall output characteristic.

16. The method as recited in claim 11, wherein:

said step of sensing an overall output characteristic, comprises the steps of:
receiving and temporarily storing said overall output characteristic in a first sample and hold circuit, and developing therefrom a sampled overall error signal with said overall control circuit; and said step of sensing an output characteristic, comprises the steps of:
receiving and temporarily storing an output current of said associated power supply module in a second sample and hold circuit,
developing therefrom a sampled current error signal representing a deviation from an average of output currents of said power supply modules with said separate module control circuit, and
generating an intermediate regulating signal from said sampled overall error signal and said sampled current error signal with an accumulator associated with said separate module control circuit.

17. The method as recited in claim 11, wherein:

said step of sensing an overall output characteristic, comprises the steps of:
receiving and temporarily storing said overall output characteristic in a first sample and hold circuit, and developing therefrom a sampled overall error signal with said overall control circuit; and said step of sensing an output characteristic, comprises the steps of:
receiving and temporarily storing an actual output current of said associated power supply module in a second sample and hold circuit,
developing therefrom a sampled current error signal representing a deviation of:
a ratio of said actual output current to a maximum output current of said associated power supply module from
a ratio of an actual output current of said modular power supply to a maximum output current of said modular power supply, and
generating an intermediate regulating signal from said sampled overall error signal and said sampled current error signal with an accumulator associated with said separate module control circuit.

18. The method as recited in claim 11 wherein said overall output characteristic is a function of an output voltage of said modular power supply.

19. The method as recited in claim 11 wherein said overall output characteristic is a function of an output current of said modular power supply.

20. The method as recited in claim 11 wherein each of said power supply modules comprises power conversion circuitry coupled to an output of said modular power supply via an impedance network, said method further comprising the step of combining outputs of each of said power supply modules to yield an overall output of said modular power supply.

21. For use in a modular power supply having a plurality of module slots capable of receiving power supply modules therein and an overall control circuit for sensing an overall output characteristic of said modular power supply and developing therefrom an overall error signal representing a deviation of said overall output characteristic from a reference characteristic, a power supply module, comprising:

power conversion circuitry; and a module control circuit for sensing an output characteristic of said power supply module and developing therefrom and from said overall error signal a regulating signal for said power supply module, said regulating signal controlling said power conversion circuitry thereby to affect said overall output characteristic of said modular power supply.

22. The power supply module as recited in claim 21 wherein said module control circuit senses an output current of said power supply module and develops therefrom a current error signal representing a deviation from an average of output currents of said power supply modules, said module control circuit combining said current error signal with said overall error signal to further develop said regulating signal.

23. The power module as recited in claim 21 wherein said module control circuit senses an actual output current of said power supply module and develops therefrom a current error signal representing a deviation of:

a ratio of said actual output current to a maximum output current of said power supply module from a ratio of an actual output current of said modular power supply to a maximum output current of said modular power supply, said module control circuit combining said current error signal with said overall error signal to further develop said regulating signal.

24. The power supply module as recited in claim 21 wherein said module control circuit develops said regulating signal from a second reference characteristic of said power supply module.

25. The power supply module as recited in claim 21 wherein said module control circuit develops said regulating signal directly from said overall output characteristic.

26. The power supply module as recited in claim 21, further comprising:

a first sample and hold circuit for receiving and temporarily storing said overall output characteristic, said overall control circuit developing therefrom a sampled overall error signal;

a second sample and hold circuit for receiving and temporarily storing an output current of said power supply module, said module control circuit developing therefrom a sampled current error signal representing a deviation from an average of output currents of said power supply modules; and an accumulator, associated with said module control circuit, for generating an intermediate regulating signal from said sampled overall error signal and said sampled current error signal.

27. The power supply module as recited in claim 21, further comprising:

a first sample and hold circuit for receiving and temporarily storing said overall output characteristic, said overall control circuit developing therefrom a sampled overall error signal;

a second sample and hold circuit for receiving and temporarily storing an actual output current of said power supply module, said module control circuit developing therefrom a sampled current error signal representing a deviation of:

a ratio of said actual output current to a maximum output current of said power supply module from a ratio of an actual output current of said modular power supply to a maximum output current of said modular power supply; and an accumulator, associated with said module control circuit, for generating of an intermediate regulating signal from said sampled overall error signal and said sampled current error signal.

28. The power supply module as recited in claim 21 wherein said overall output characteristic is a function of an output voltage of said modular power supply.

29. The module as recited in claim 21 wherein said overall output characteristic is a function of an output current of said modular power supply.

* * * * *